US005959536A

United States Patent [19]
Chambers et al.

[11] Patent Number: 5,959,536
[45] Date of Patent: *Sep. 28, 1999

[54] TASK-DRIVEN DISTRIBUTED MULTIMEDIA CONSUMER SYSTEM

[75] Inventors: Paul Chambers, San Jose; Saurabh Srivastava, Sunnyvale, both of Calif.

[73] Assignee: Philips Electronics North America Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/731,624

[22] Filed: Oct. 15, 1996

[51] Int. Cl.$^6$ .............................. G08B 21/00; G06F 9/45
[52] U.S. Cl. .................... 340/636; 395/284; 395/651; 395/653; 395/701; 395/704
[58] Field of Search ........................ 340/636; 395/701, 395/702, 703, 704, 705, 651, 652, 653, 284

[56] References Cited

U.S. PATENT DOCUMENTS

| | | | |
|---|---|---|---|
| 5,212,792 | 5/1993 | Gerety et al. | 395/701 |
| 5,265,249 | 11/1993 | Kumamoto | 395/704 |
| 5,295,263 | 3/1994 | Kojima et al. | 395/653 |
| 5,353,411 | 10/1994 | Nakaosa et al. | 395/651 |
| 5,454,109 | 9/1995 | Bruynooghe et al. | 395/701 |
| 5,493,681 | 2/1996 | Badger et al. | 395/701 |
| 5,546,301 | 8/1996 | Agrawal et al. | 395/701 |
| 5,559,965 | 9/1996 | Oztaskin et al. | 395/284 |

OTHER PUBLICATIONS

"Device Drivers via the Access Bus" IBM Technical Disclosure Bulletin, vol. 39, No. 1, Jan. 1996.

*Primary Examiner*—Jeffery A. Hofsass
*Assistant Examiner*—John Tweel, Jr.
*Attorney, Agent, or Firm*—Peter Verdonk

[57] ABSTRACT

A control system comprises multiple consumer electronics devices and task-driven control means coupled to the devices for controlling an interaction among the devices. The control means acts on respective software representations of each respective one of the consumer devices. By encapsulating the variable complexity of the task within a software representation, it can be made as simple or as sophisticated as needed to bring the capabilities up to a common level. Since the level of interface is common to the devices, applications can uniformly manipulate devices which embody very different levels of sophistication.

20 Claims, 2 Drawing Sheets

TASK-DRIVEN DISTRIBUTED MULTIMEDIA CONSUMER SYSTEM

FIELD OF THE INVENTION

The invention relates to a system having spatially distributed information processing functionalities. The invention relates in particular, but not exclusively, to a multimedia consumer systems.

BACKGROUND

The consumer electronics industry is in the beginning of a major shift as entertainment systems move from the analog domain into the digital domain. Audio has moved into the digital domain with, e.g., compact disks and digital compact cassettes. Video will move into the digital domain rapidly within the next years. An all-digital multimedia system with digital audio and digital video opens up new possibilities to the consumer, owing to impressive digital processing capabilities that are becoming available for affordable prices. To mention a few of the new possibilities, real time video processing has come within reach of consumer apparatus; user control relies more and more on the system's intelligence thus rendering the system much simpler to operate and relieving the user from monitoring the system; multiple digital resources are going to be interrelated and integrated within a single home system.

OBJECT OF THE INVENTION

The inventors have realized that the integration of an ever increasing number of possibly interacting functionalities into a single system can be made attractive to both the consumer and the manufacturer if the system design supports distribution of the system's functionalities, scalability of the architecture, and closed-loop control. A system with distributed functionalities is failure tolerant in the sense that a hardware failure in one of the systems components need not affect the others. Functionality distribution also supports scalability. An architecture is scalable, or open, if it allows conflict-free reconfiguring, upgrading or extending of the system. By adding or removing functionalities as needed to match the demands, the manufacturer or the user can optimize system performance while minimizing costs. Closed-loop control means that a component, responding to a stimulus from another component or from the user, confirms receipt of the stimulus. In this manner, the system as a whole can keep track of the status of each of its components.

It is an object of the invention to provide a system having distributed functionalities. It is another object to provide a control system that has an open architecture.

SUMMARY OF THE INVENTION

To this end, the invention provides a control system comprising multiple electronic devices interconnected through a task-driven control means for controlling an interaction among the devices. The control means acts on respective software representations of each respective one of the devices. Preferably, at least a specific one of the electronic devices downloads its respective software representation to the control means, e.g., upon connection to the control means. Preferably, each of the respective software representations comprises a device abstraction for representing the respective device at a semantic level common to the representations and at least a particular one of the respective software representations comprises an application of a user-interface to the device abstraction, the application being run on the control means.

In order to be more specific, the invention provides in the field of consumer electronics a control system comprising multiple consumer electronics devices (e.g., a television receiver, a VCR, a CD-player, DVD-equipment, but also a telephone, lighting control system, thermostat, even a PC, etc.) interconnected through a task-driven control means for controlling an interaction among the devices. The control means acts or respective software representations of each respective one of the consumer devices.

While the transition to digital content and media brings numerous improvements in delivered quality and inconvenience, the invention now offers the opportunity to provide intelligence in how devices interact with one another, and it offers system-level integration features to the user. It becomes possible to provide true ease-of-use and system-wide control of a cluster of devices. The invention allows true plug-and-play. The invention allows devices that configure themselves automatically to deliver their optimum performance within the context of the system. To achieve these highly desirable goals, devices must interoperate, i.e., must share a common method of communication and message exchange between themselves, in order to 'speak the same language'. This common language bridges the gap between the user and the (possibly multiple) low-level protocols. The common language includes solutions for at least three different aspects: the user-interface, the abstraction of a device, and the communication. It provides a standardized execution environment, both for user-interface and device abstractions, applications and systems services (e.g. messaging, registration and discovery), and a communications mechanism for extending the environment dynamically through, e.g., plug-and-play or other means.

The software representation operated upon by the control means hides the idiosyncrasies of the associated one of the real consumer devices. The software representation presents a more uniform interface for higher levels of software, similarly to device drivers in an operating system. By encapsulating the variable complexity of the task within a software representation, it can be made as simple or as sophisticated as needed to bring the capabilities up to a common level. Since the level of interface is common to the software representations, applications can manipulate, in the same manner, real devices which embody very different levels of sophistication. As to user-interface aspects, these have become task-driven, in contrast with the device-driven character in the conventional approaches. The user-interface has become customizable and extendible owing to the uniformity at the common level provided by the software representations.

This software representation of real consumer devices provides the ability to support devices as yet unknown, and to support new and various underlying networks, protocols and standards. The overall goal of the system according to the invention is to become a complete solution for the home environment. To achieve this, the system's protocol must define user-interface conventions, device abstractions and networking protocols to enable devices, yet to be built, that provide complete end-to-end solutions of value to the end-user. The inventors believe that previous efforts to establish technologies which progress this aim have not been received well, simply because they have added cost to devices without yielding user-visible benefit. By providing complete solutions, customers will see the benefit and value, and the industry can again move forward and innovate upon a new platform.

The invention is especially relevant to consumer electronics in the home entertainment environment, but is not restricted thereto. For example, another example of a technical field that is increasingly being affected by the trend toward all-digital control and modular architecture is automotive applications. Car manufacturers and supply industries are putting more effort into digital control systems that allow the incorporation of sophisticated functionalities at affordable prices: electronically controlled gauges, anti-lock brake systems, electronic fuel injection, electronic motor management and emission control, electronic climate control, adaptive automatic transmissions, car audio equipment, navigation equipment etc. These functionalities have all different kinds of sophistication and operation. Manufacturing is considerably simplified if, at the assembly line, modules are installed whose functional interconnection relies on control via the software representation as proposed by the invention. The manufacturer does not have to make special reservations, regarding the electronic equipment, for each different combination of options. Further, interaction among these modular sub-systems brings the user-friendliness and efficiency of an automobile on a higher level.

As an example, the volume of the audio equipment is controlled in dependence on the road speed measured (wind noise), the engine speed (engine noise), and the level of activity of the climate controls (fan noise). As another example, the graphics navigation equipment (e.g., the CARIN system of Philips Electronics) is made controllable depending on the road speed measured in order to allow for zooming in or out when more or fewer details are needed to guide the driver. As yet another example, the motor management and adaptive automatic transmission sub-systems are fine-tuned depending on the load (measured via the active suspension).

Accordingly, the invention offers a protocol to combine wildly different functionalities in a single system to the advantage of the consumer and manufacturer.

BRIEF DESCRIPTION OF THE DRAWINGS

The invention is explained in further detail and by way of example with reference to the accompanying drawings, wherein.

Throughout the figures, same reference numerals indicate similar or corresponding features. It should noted that the diagrams indicate features of the invention as separate items that are implemented in software. The diagrams therefore should be interpreted accordingly.

PREFERRED EMBODIMENTS

SYSTEM HARDWARE CONFIGURATION

Figure 1:
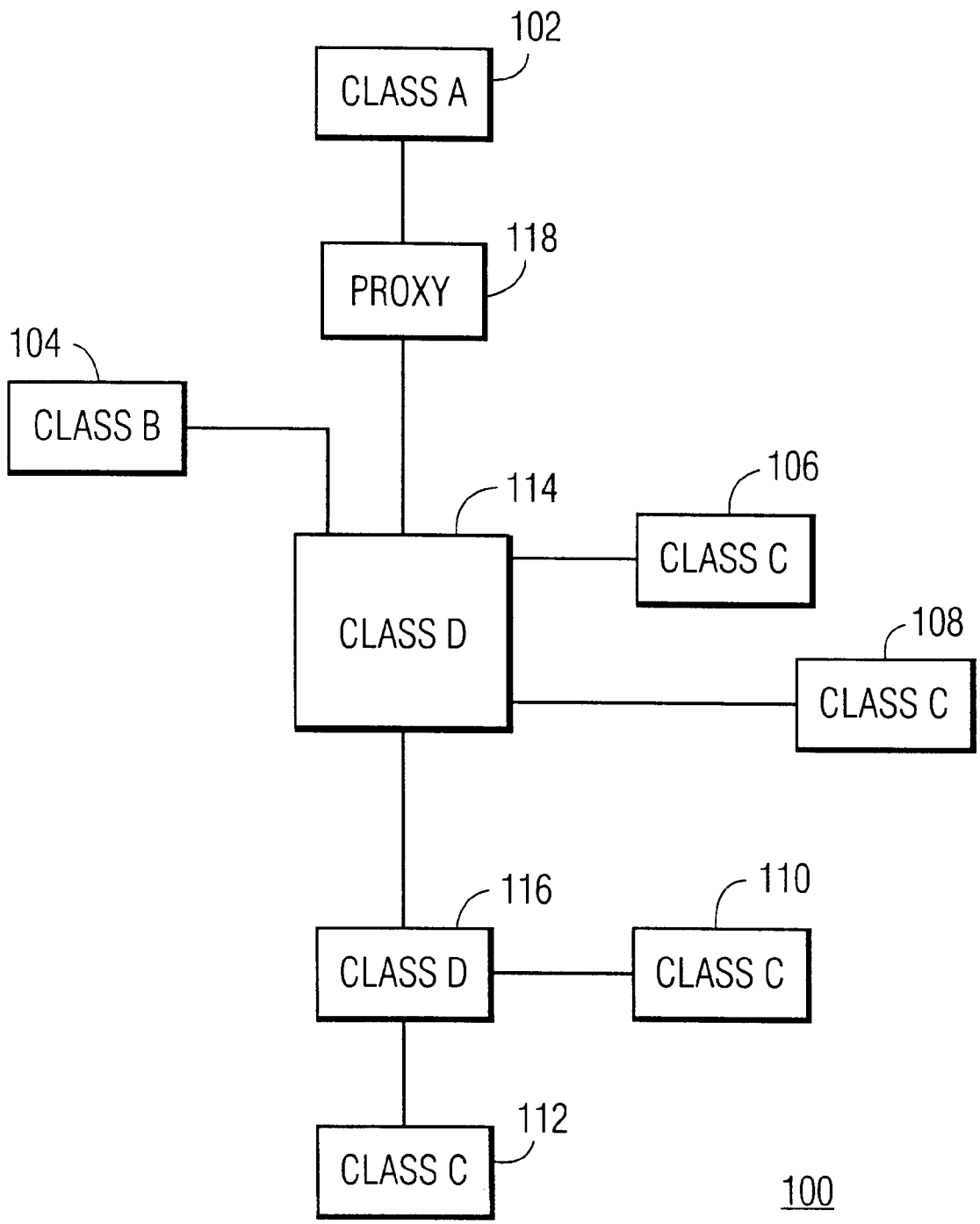
FIG. 1 is a block diagram of a system with consumer devices according to the invention.

FIG. 1 is a block diagram of a control system 100 according to the invention. System 100 comprises multiple consumer electronics devices 102, 104, 106, 108, 110, . . . , and 112. System 100 further includes one or more control means such as control means 114 and 116, in the example shown. Devices 102–108 are connected to control means 114. Devices 110 and 112 are connected to control means. Control means 114 and 116 are interconnected. System 100 and its protocol, discussed in more detail further below, provide the infrastructure to control the routing and processing of content data by controlling the function modes of devices 102–112. Control data controls the processing of content data, such as audio and video content, by devices 102–112. Control means 114 and 116 are also coupled to each other. Control of system 100 is explained below. Control is enabled by control means 114 and 116 having a software representation available of each device connected thereto.

In order to appreciate the operation and versatile character of system 100, a categorization of the communications abilities of consumer electronics devices 102–112 is discussed first. While in reality there is a smoother continuum of device capabilities than is acknowledged here, this categorization is very useful in understanding the model of system 100. The communication capabilities or devices 102–112 in this generic example have different levels of sophistication. Dependent on their communication capabilities, devices 102–112 belong to one of the following classes:

Class A: legacy devices with limited one-way control;

Class B: controllable devices with conventional two-way control;

Class C: intelligent devices with coded user-interface abstraction and device abstraction;

Class D: sentient devices capable of providing the execution environment for the abstractions downloaded from a class C device.

Class A: Legacy devices

Device 102 is a device belonging to a Class A of legacy consumer-devices. The control functionality of a legacy device is limited to one-way (unconfirmed or unacknowledged) control. A typical example of a legacy device is the conventional, well established audio/video equipment controlled by infrared commands via a handheld remote. The confirmation mechanism relies on the user observing the command being executed by the device (the channel changes, tape starts playing, etc). There is no confirmation protocol for issuing a return command back to the remote that the first command was received. Device 102 is not able to action the return command, report status or error conditions, etc. The protocol in system 100 has no choice but to consider the transmission of a command to legacy device 102 as 'success', and has no means of determining the state of device 102 prior to attempting to change it. This is a particular problem for commands that 'toggle' or otherwise implement a relative change of state, like 'Power On/Off' or 'Channel Up'. For this reason, legacy device 102 can only be supported on a 'best-effort' basis. Given the existing installed base of equipment that falls into the category of legacy devices, it must be supported as well as possible. However, it should be clear that great benefits are involved in upgrading to devices with better communications support.

Class A devices may be controlled indirectly via a proxy, such as device 102 is through proxy 118. For example, device is a conventional television receiver that is now controlled by an IR-blaster 118, the latter being controlled via Class D device 114.

Class B: Controllable devices

Device 104 belongs to a Class B of controllable consumer-devices. Some 'two-way' protocols do exist for the control of consumer electronics devices, which provide confirmation of command execution, status and error reporting. Unfortunately, these are much less common in consumer products. The protocols are typically 'fully-enumerated' protocols, in that they have been completely defined and provide little or no support for extension of the protocol in a forward-compatible manner. Because of this 'prior knowledge' requirement, controlling devices and controlled devices have to live within the confines of the protocol, and innovation is stifled because of the 'chicken-and-egg,' problem (enhance the controlled device, and no existing controllers can take advantage of the enhancements, and vice-versa). The consumer electronics industry has invested quite some effort in this class of protocols. Examples of these protocols are A/V CTS, Philips EasyLink/ESI and D2B, Sony's Control-L, LANC and S-Link/Control-A, CEBus/CAL, LonWorks, etc.

System 100 and its control protocol provides a much improved user experience with this class of controllable devices. System 100 still has to have 'prior knowledge', however. The protocol used must have appropriate support pre-installed or must employ some non-transparent mechanism to install support for new devices and/or protocol enhancements. This distinction will become clearer after reading the definition of the next classes of devices in what follows.

Like Class A devices, a Class B device may be controlled via a proxy (not shown in the example of FIG. 1).

Class C: Intelligent devices

Devices 106, 108, 110 and 112 belong to the class of intelligent consumer-devices. Devices 106–112 each provide a forward-compatible 'plug-and-play' capability. In essence, each of devices 106–112 contains a software representation: an optional user-interface (see below under 'Appler') and a device abstraction (see below under 'Abstract Device'), both compiled into machine-independent bytecode. A simple extension has been added to the native protocol of each of device 106–112 to enable another device to detect it, and retrieve the compiled bytecode. That other device can now execute the bytecode locally, and provide control of device 106–112. Preferably, the communication protocol used between the downloaded device abstraction and real device is private. The control protocol in system 100 defines the discovery and download protocol, and an execution environment for the downloaded bytecode. It also defines (by convention) a core set of functionalities that the device abstraction for a given type of device (e.g. 'VCR') should implement, so that third party applications may take advantage of the capabilities of the device. The 'chicken-and-egg' enhancement problem has been side-stepped, however. Since the user-interface has been downloaded with the device abstraction, they can implement enhancements over and above the core set, and 'de facto' standards can arise without revising the standard and dealing with an 'obsolete' installed base. This 'definition by convention' is one of the large differences between the modus operandi of the computing industry and consumer electronics industry. It permits rapid innovation and a form of commercial and technical 'Darwinism'.

Class D: Sentient devices

Control means 114 and 116 belong, in this example, to the class of sentient consumer-devices. Sentient devices 114 and 116 provide the execution environment for byte-code downloaded from Class C devices 106–112. Devices 114 and 116 may have a user-interface capable of supporting the user-interface portion of the byte-code downloaded from devices 106–112. Class D devices 114–116 communicate with one another as peers, in a loosely-coupled distributed system. One of the goals of the communication protocol in system 100 is to enable decentralized control of the home (vs. the PC-centric centralized control, dumb peripherals model), without placing a heavy cost burden on all participating devices. In the considered model of the home, there are 'clusters' of devices. The intelligence is centralized within a cluster to some degree, without endangering the distributed nature of system 100 as a whole, and without precluding a greater level of decentralization for future generations of such systems. Class D devices 114 and 116 typically contain more intelligence and computing resources than is characteristic of conventional consumer electronics devices. Class D devices 114–116 could have far less resources than is typical for the 'PC/TV' class of devices, however, and may prove to be more typical similar to Network Computers (NCs) in computing capacity.

Note that Class D devices 114 and 116 may also themselves be provided with consumer apparatus functionalities.

INTERACTION BETWEEN THE DEVICES

Support of Class A device 102 or a Class B device 104 entails that a device abstraction for it already exists in Class D device 114 or 116. The expression 'requires prior knowledge' is used to infer that Class D device 114 or 116 cannot support forward-compatibility and transparent, hot plug-and-play for new types of Class A device 102 and Class B device 104. Note that it does not preclude a device abstraction from supporting whatever 'plug-and-play' features a Class B device might provide, such as the 'Unit Info' ability of A/V CTS/P1394 devices. The inventors regard that as a less ambitious goal of 'self-configuration', not true 'plug-and-play' in the more narrow, specific sense used here. A new Class C device may previously be completely unknown to Class D device 114 or 116, and the process of integrating it into system 100 does not require participation of the user beyond physically connecting cables. In this sense, the 'plug-and-play' functionality offered by the combination of Class C devices and Class D devices is intended to provide forward-compatible, self-installing functionality, not just self-configuration of a previously-known device type.

This true 'plug-and-play' is made possible by transporting bytecode from a newly discovered Class C device and extending the environment within Class D device 114 or 116 with it. By cleanly dividing the user-interface portion from the device abstraction portion in the byte-code, and establishing an API (application program interface), which may be extended by convention, the inventors have created an environment where third parties may add functionality to the platform, too. For example, a company could create a video-editing package that supports the 'VCR' core API, and add functionality if the device abstractions support the 'Editing VCR' extensions (perhaps time-code support, frame-accurate positioning, pre-roll, etc.). The separation of user-interface, device abstraction and communications allows the solutions for these different problems to progress at different paces, and allows more advanced solutions for some problems to coexist with more primitive ones for others. By providing solutions to the bulk of the common problems, it eases and simplifies the development of device support for the architecture, thereby lowering the barrier for adoption that manufacturers must overcome.

Another concept important to understanding how the downloading mechanism works is that of the 'ball of yarn' connection model. Once the byte-code has been downloaded from a Class C device, such as device 108, to a Class D device, e.g., device 114, the code is instantiated and 'wakes up' not knowing how it got there, or how to communicate back to device 108 from which it came. Thus, it is the responsibility of the subsystem instantiating the downloaded byte-code to also inform it of the device address to communicate with device 108 it was loaded from—the 'yarn' that allows it to find its way back across the communications medium to the device it is representing.

For a given communications mechanism, there may be standard protocols used in device control, A/VC for P1394, for example. In the interests of keeping the downloaded byte-code small, each supported communications protocol for download preferably also defines device services for support of control protocols appropriate for that communications mechanism, which a downloaded device abstraction may leverage.

Abstract Device and Applet

Figure 2:
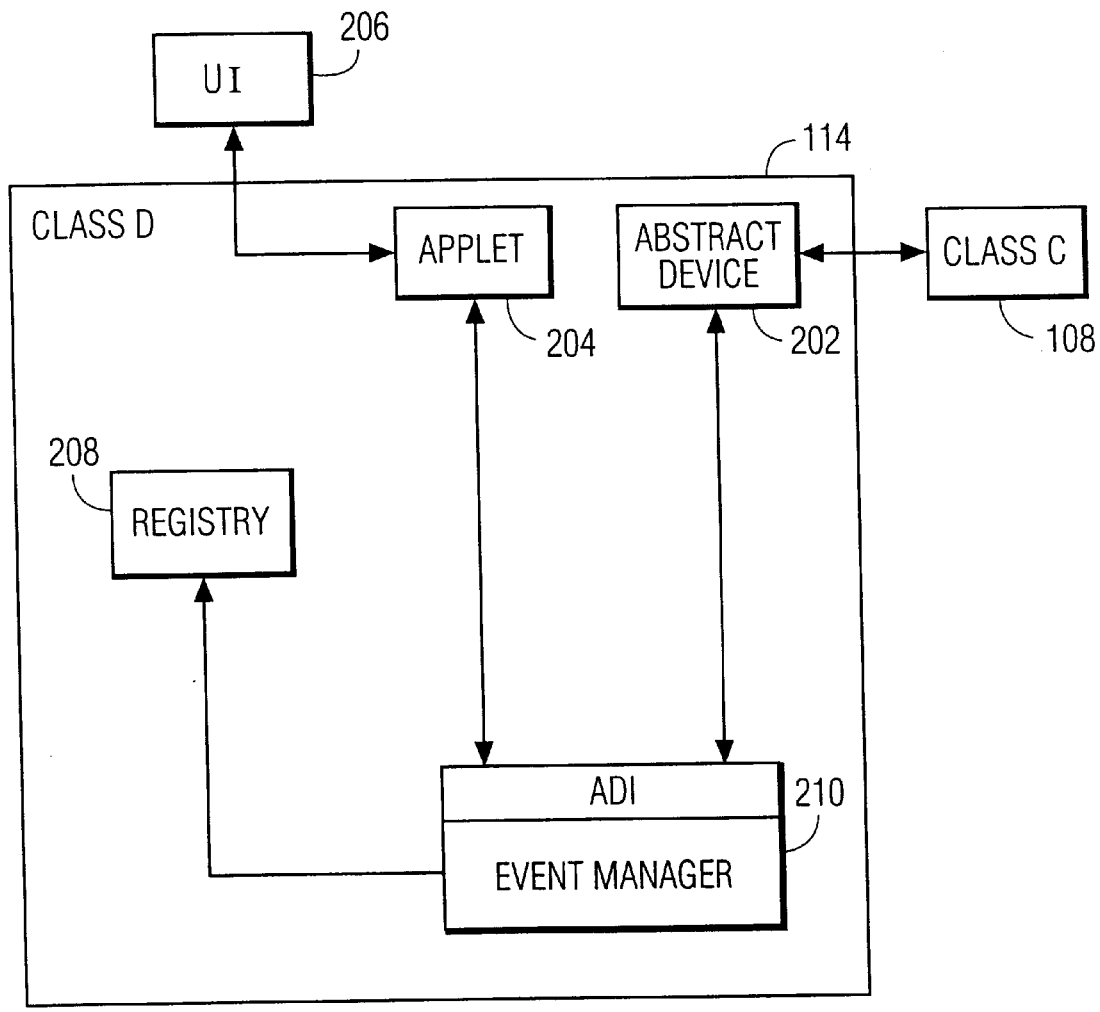
FIG. 2 is a block diagram of a Class D device in the system of FIG. 1.

FIG. 2 is a diagram showing in more detail the software functionalities involved in the interaction of a Class C device, e.g., device 108 with a Class D device, e.g., device 114.

For each real device 102–116 with consumer functionality, there is a device abstraction, termed the 'Abstract Device'. FIG. 2 shows an Abstract Device 202 downloaded to Class D device 114 from Class C real device 108. Abstract Device 202 has the responsibility of translating command messages (see below) it receives into actions on real device 108 it represents. Abstract Device 202 also has the responsibility of reporting status changes in real device 108 as event messages (see below).

The Abstract Device hides the idiosyncrasies of the real device and present a more uniform interface for higher levels of software, similarly to device drivers in an operating system. By encapsulating the variable complexity of the task within a device abstraction, it can be made as simple or as sophisticated as needed to bring the capabilities up to a common level. Since the level of interface is common to the devices, applications can manipulate, in the same manner, devices which embody very different levels of sophistication.

The user-interface for an Abstract Device is referred to as a 'Device Application' or an 'Applet', or just 'application' in this text. FIG. 2 shows an Applet 204 for Abstract Device 202. The Applet may be downloaded from the associated Class C device, or it may already be residing at the Class D device. The Applet runs on Class D device 114 or 116 being used by the user interacting with system 100. The Applet may not be running on the same Class D device which is hosting the Abstract Device. For example, the Applet for the Abstract Device of device 108, which is hosted by Class D device 114, may be run on Class D device 116. This may be the case when Class D device 114 has no means, e.g., a display, to support the Applet for device 108 that requires a graphical user-interface, whereas Class D device 116 does have a display of its own or does have direct access to a device with a display, e.g., Class C device 110. For this reason, an Applet and the Abstract Device communicate through a messaging system, to make the actual location of the Abstract Device transparent to the Applet. For more details, see 'Messaging' below. There is also a Registry, which is used to locate Abstract Devices by their attributes. See under 'Registry' below for more details. In the example of FIG. 2, Applet 204 interfaces with a user-interface 206, e.g., of control means 114.

SERVICES

System 100 provides a number of services on a system wide-basis. One of the services is the registering/unregistering of devices, another one is the messaging between the Abstract Devices and the Applets in order to allow them to be located on different Class D devices without requiring them to behave differently. In other words, Abstract Devices and Applets communicate through messaging, also when residing in the same Class D device.

The execution environment in the example of FIG. 1 devices 114 and 116, provides a 'Registry' facility with which objects can register and thus advertise themselves in a standard way. The object provides a number of attribute values when registering, and other objects can then find it by performing a 'query by attribute'. Once located, the object is communicated with through the Messaging System. This enables the actual location of an object to be transparent allowing an Applet running in one device to control some resource provided by another in the same manner it would for a local resource. The communication protocol uses 'events' (messages that sent to multiple recipients, based on their previously-declared 'interests') to disseminate information about significant changes in the state of devices, and it provides a standardized Event Manager to support both the objects wishing to notify the system and those objects interested in being notified. These concepts are discussed in more detail below.

Registry

Each of Class D devices 114 and 116 is provided with a Registry. In FIG. 2 device 114 is provided with a Registry 208, for example. Registry 208 provides a service on a system-wide basis to locate Abstract Devices, e.g. Abstract Device 202, by their attributes. The Abstract Devices register, and thus advertise themselves, with Registry 208 in a standard way. Registry 208 returns a reference to an object that may receive messages on behalf of the Abstract Device. It should not be assumed that this is a reference to the Abstract Device itself. In the reference implementation it never is, even if the Abstract Device is local.

Registry 208 provides an API for registering, registering and querying for objects that can receive messages. It may be used for any message-receiving resource that offers a service to system 100 as a whole. It is intended for Abstract Devices and similar objects (e.g., the individual Events Manager see below), where there is a single instance system-wide, and where it is desirable to make the actual location of that instance transparent.

Registering a resource requires a set of attributes and a reference for an Abstract Device or an object that will receive messages on behalf of the entity registering. Unregistering requires providing the same reference to the Abstract Device or object receiving messages.

Querying involves providing a partial set of attributes to match potential Registry entries against. The query can also be specified as 'local-only'. The reason for this is that the Registry may have to communicate with other Registries on remote Class D Devices, and could create 'proxy' mailboxes for communication with remote Abstract Devices that will not be used.

Messaging

The interface between Applets and Abstract Devices is termed the Abstract Device Interface (ADI). It is based upon pure messaging, to allow Applets and Abstract Devices to be located on different Class D devices without requiring them to behave differently. In other words, Applets and Abstract Devices always communicate through messaging, even when they reside in the same Class D device.

Messages are passed by calling a 'Send Message' method on the destination instance. It is possible to 'stack' message-processing Abstract Devices or objects by having each one's 'Send Message' method invoke the 'Send Message' method on the next object in the chain. In this fashion, arbitrarily complex processing can be performed efficiently, by daisy-chaining simple, single-function message-processing objects. This is used extensively by the Event Manager (see below).

For transfer of messages between Class D devices, the registry creates a 'Remote Mailbox' object, which is responsible for 'flattening' (or 'serializing') messages, addressing, and sending them to the remote machine, where the Registry recreates ('inflates') the message again, and delivers it to real recipient.

Implementations of the 'Send Message' method must execute quickly to retain the performance and responsiveness of the system. For those situations where processing cannot occur immediately, or could take some time, a 'Queued Mailbox' class is available. This puts the message on an internal queue, and a separate thread removes messages to deliver them. This decouples the message sender and message recipient, so that the recipient is free to take the time required to process each message. Generally, there are tree classes of messages in system 100: Commands, Events and Errors.

Commands

These normally flow from an Applet to an Abstract Device. It is a request to perform some action, or query some status information. It only initiates an operation. The success or failure of the operation is sent as another message at some later point.

Events

Events are generated indirectly in response to a command, or asynchronously due to some external condition on one or more of devices 102–116 (the user inserting a tape, for example). This mechanism is generally used to keep the Applets informed about what is happening in system 100. Events are 'multicast' and may be received by any interested party among devices 102–116, anywhere in system 100. This is important for the support of multiple Applets viewing the same Abstract Device simultaneously. The results of the actions of one user should be reflected in the user-interface of each Applet as quickly as possible.

Errors

Errors are generally the result of attempting a command, though they may not be. Perhaps a network link to another Class D device failed, and an error is broadcast to anyone with an interest—see 'Events', above. At any stage that might fail in delivering and executing a command, an error message may be generated and returned if the command cannot progress further. It is important that the error contain significant information about the failure, generated at the point of failure. It can be very difficult to diagnose problems in a distributed system such as system 100 otherwise, particularly for end-users.

Errors are similar to events in many respects, though one difference is particularly important. When an error message is generated in response to a command message, it is sent directly back to the originator of the command, and also broadcast for the benefit of other interested parties among devices 102–116. Sending it directly to the originator is necessary to guarantee that the originator sees a response to the command, even if it has not expressed interest in that type of message. See also the discussion of synchronous messaging below.

Synchronous messaging

Sending a command message only initiates the operation. The operation is only complete when a response message is returned at some later point. In this sense, the system is truely asynchronous by its very name, and there may be a long (inherently variable) period between issuing the command message and receiving an error or event in response. While asynchronous messaging is appropriate for the environment, and its use is strongly encouraged, it is a departure from the more usual linear execution path of code. In order to provide the convenience of 'synchronous' messaging, i.e. sending a message and waiting until a response can be returned, a service is defined which takes care of suspending the execution path until a response from the destination is received. To support this service, each command message is stamped with a system-wide unique sequence ID, which is transferred to events or error messages which are created as a result of that command message, and can be identified as a response to that message in particular. The synchronous messaging service uses the sequence ID of the outgoing command to filter through incoming responses, and so can identify the first response to the command and return it as a result to the caller, making the process synchronous without forcing synchronicity on the system as a whole.

Event Manager

Each Class D device, e.g., device 114, has an Event Manager, e.g., 210. The Event Manager builds on top of the Messaging system to provide the distribution of events throughout system 100. It is used extensively by Abstract Devices to report significant status change events, but is also used by some other subsystems to report events of system-wide significance, such as the detection of another Class D device. At its center is a special 'one-to-many' mailbox, which takes a single message and delivers it to a potentially large number of recipients. Each recipient is likely to be one or more filters chained together, which will discard messages that are not of interest to the final recipient.

One case is worth mentioning in particular. Each remote Class D device has a filter attached which only passes messages that originated locally, which is in turn attached to a remote mailbox that points to the input of the remote Class D's Event Manager. In this fashion, local events are broadcast to all remote Class D devices, and each in turn broadcasts its local events. These filter/mailbox pairs are added by the Event Manager itself when it receives an event announcing the detection of a new remote Class D device (and removed when the Class D device disappears and a corresponding event is broadcast locally).

The Event Manager registers the 'one-to-many' mailbox with the Registry, so that other remote Event Managers may locate it and forward their locally-generated events. But for normal use, the Event Manager provides a public static method to allow events to be sent without a Registry lookup and storage of a mailbox handle locally. Other public methods allow interested parties to attach (or remove) another mailbox from the output of the 'one-to-many' mailbox.

The Event Manager also includes a number of useful message-processing classes for the benefit of other subsystems, like various message filtering classes.

Communications

Communications within the interaction protocol covers the exchange of data between devices over a network or other communications medium. The Messaging System relies upon the a high-level Communications Service when it needs to transport a message to a destination which is not on the same device. This high-level service hides the differences between protocols, and provides a uniform addressing scheme.

Device abstractions may have more protocol-specific needs in communicating with their physical device, and so are more likely to need the services of a set of lower-level protocol-dependent communications services.

The lower-level services are also responsible for detecting and notifying the environment of new devices appearing on the network. This triggers the Class C download process. They also provide an indication when network devices disappear. This is useful for marking remote references as stale, and avoiding presenting options in the user-interface that are no longer available.

Protocol-independent Communications

The Messaging System relies upon a higher-level, protocol-independent communications service to communicate with the Messaging System on other Class D devices. The other services use the Messaging System to communicate with their kindred on other devices. The Messaging System uses a uniform addressing scheme that the high-level communications service provides. This is desirable for consistency within the Messaging System, but it is also necessary, since some networking protocols use dynamically-assigned network IDs, which may be reassigned on the fly (P1394 does so when a device is added, for example). The high-level communications service maintains a reliable mapping between the ID provided to the Messaging system and the physical network address, even when it changes.

Protocol-dependent Communications

Since the communication between the device abstraction and device being abstracted is considered private, the implementer is free to choose whatever protocol or mechanism is appropriate for that communication.

Device abstractions typically need more protocol-dependent control of their communication with the real device that they represent. Though it is entirely up to the implementer of the Class C device, it is expected that the device abstraction will use the lower-level protocol-dependent communication services to converse with its physical device (rather than the higher-level message-oriented service), although a particular communication protocol service may define some additional support for protocols above the needs of the messaging system.

Device abstractions may also exist for devices which are integrated into the Class D device, for those that are not pure controllers. These device abstractions are expected to deal directly with whatever native device driver or OS service is appropriate to control the integrated functionality.

Additional Protocol-dependent Services

For a given communications mechanism, there may be standard protocols used in device control, A/VC for P1394, for example. In the interests of keeping the downloaded bytecode small, it is proposed that each supported communications protocol for download also define device services for support of control protocols appropriate for that communications mechanism, which a downloaded device abstraction may leverage. Note that these services must remain backward- and forward-compatible, to ensure the continued interoperability of devices, i.e. once defined, they cannot be significantly altered.

Plug-and-play Support

The lower-level communications services provide notification when a new device is identified on the network for which they are responsible. For those networks whose protocols detect insertion or removal of nodes, that ability is used. For others, a broadcast message is sent periodically, inviting new nodes to respond. New nodes may optionally send a broadcast announcing their availability, although since broadcasts are not typically guaranteed delivery for most protocols, the polling broadcasts provide a safety net to catch devices when that initial broadcast fails.

The new 'device' event is caught by a Package Downloader, which interrogates the device to see if it supports the Class C extensions. Since the conventions for Class C package download vary by protocol, it enrolls the assistance of the protocol-dependent service. If the Class C package exists, and has either a manufacturer/model number attribute that has not been seen by this environment, or has a more recent version of one that has been seen, the package is retrieved. It is then passed onto the Package Loader, which integrates the package contents into the environment.

Signal Routing ('Switch')

System 100 is focused upon the control of consumer electronics devices, but part of that control is the establishment of signal routing between devices being controlled. This mechanism is intended to be general and extensible. A 'Switch' service allows the specialized knowledge and global state to be encapsulated, and insulated from the more general applications in the system. It also permits signal routing to be established within a macro without the macro having to embed an explicit, detailed setup for it, which might fail in the future because of differing resource assignments (isochronous channel assignments, for example).

Named Routes

A 'Named Route' is akin to a 'preset' for a particular signal route and configuration from a source device to a destination device. The route consists of the connections between the source device, any intermediate signal processing blocks, and the destination device. It also may include setup information for those signal processing blocks.

A command to establish a particular 'Named Route' may be embedded in a macro, or associated with a source device and/or media type. For example, inserting a DVD movie disc into a DVD drive might trigger a macro that establishes a Named Route called 'DVD Movie'. In that route is information that routes the MPEG-2 data stream to an MPEG decoder, then the video through a line doubler, and the audio through a DSP block, configured for AC-3. Inserting a CD into the DVD drive might trigger 'CD Music', which routes audio through the DSP block, configured for a music surround mode, and route an on-screen display through the video subsystem.

Creating a Named Route

For the user's convenience, it is highly desirable to hide much of the complexity involved in the routing and processing of a media stream. He or she must be able to override the system's choices. The system intelligence required to always make the right choices in every possible situation is, however, necessarily limited. For this reason the user must be able to create and edit 'Named Routes' to the degree possible given hardware constraints. User-created or modified Named Routes should take precedence over pre-configured or dynamically-generated routes when the Switch is choosing between them automatically.

Content Formats

Devices may be capable of converting content (or signals) between different form, some of which are preferable to others. In addition, new formats will appear in the future, and it is necessary for the scheme to deal with them and their conversion. The protocol in system 100 defines content as an 'opaque' content format identifier, the only valid operation for which is testing for equality. For each content format identifier, there is an associated 'quality index', the purpose of which is to allow the Switch to choose between formats to convert content to, where a conversion is necessary. For example, a VCR might have both a composite and S-Video connection. If the signal to be recorded were originally a MPEG-2 stream from DSS, a conversion must be made to enable it to be recorded on an analog VCR. The preferred choice would be S-Video, and since its quality index would be higher, it would be chosen by the Switch.

Content format identifiers an another area where standardization by convention is preferred over trying to generalize the problem or attempt an exhaustive enumeration to achieve a solution.

Signal Processing

Various processing blocks spread amongst the devices may be capable of a similar or equivalent conversion, along the signal's path. Some may offer a better quality conversion than others (a good example is the improved quality of a 3-D comb filter over a 2-D one). In any case, it is highly desirable to minimize the number of conversions.

Therefore, in addition to providing a quality index for content formats, the protocol in system 100 requires one to be associated with each possible conversion. For example, this value is fractional, between zero and one, and each potential route is 'scored' by multiplying the values in order for each conversion along that route. The route that scores highest should provide the 'purest' route (i.e. that with the least content degradation).

Bundling of Related Content Streams

There are times when a single content stream is encoded or decoded to multiple content streams, decoding of a single MPEG-2 stream to video, multi-channel audio and perhaps subtitling information, for example. It may be important to maintain a relationship between these streams, to maintain the synchronization of audio to video, for example. The protocol of system 100 has a mechanism to 'bundle' related streams together to maintain the relationship as they are split and combined.

Each bundle acts as a hierarchical container for the content format identifiers that make up the bundle. When a single content format identifier is 'split', it is replaced in the same position by a sub-bundle containing the new content format identifiers. The inverse occurs when a sub-bundle is 'merged' to a single content format identifier.

Dynamic Analysis

The architecture allows for fully automated routing, when provided with a valid source device and valid destination device. It also supports pre-configured routes, and user-created routes. The user may also edit a dynamically-established route, converting it to a more static representation treated as a user-created route. If a pre-configured route is edited, it too becomes a 'user-created' route for the purposes of selection.

Named Routes can consist of a combination of dynamic and static information. One may statically define source and destination devices, and the surround mode of an audio DSP block, but leave the rest to the dynamic routing process. These kinds of routes are quite likely as pre-configured routes of home-theater type controllers, where some details are known, but the functionality and connectivity of an individual system requires some flexibility. For example, is only analog audio available, or is there a S/PDIF connection? Is an AC-3 signal present?. A Named Route should be considered as a structure that may be partially populated, and the Switch will attempt to 'fill in the blanks' to create a route appropriate for the current conditions.

Even in a system with only pre-configured and user-created routes, the Switch may be presented with a choice amongst routes. It is not considered acceptable for the Switch to fail to establish a route in the face of ambiguity. It uses the Quality Indexes for the Content Format Identifier and Conversions to 'score' each option, and choose the one with the highest score (that which degrades the content to the least extent).

Querying for Possible Sources and Destinations

The user-interface has a need to be able to offer the user a choice amongst possible destinations, once a source device has been identified, and possible sources, provided a destination. In an audio/visual environment, this is useful for recording, in the former case, and viewing/listening, in the latter case.

The Switch determines available routes (plus their scores) and returns them to the caller. It will remove equivalent routes that differ only in content format conversions, choosing the one with the highest score. The user-interface is expected to select the one with the highest score by default, and is encouraged to display the rest in decreasing score order.

Determining the Current Source for a Destination and vice-versa

It is desirable to have some commands affect the 'current' source for a destination (or vice-versa), rather than an explicit device or conversion. A 'volume up' or 'volume down' action associated with an on-screen control or hard button should affect the device currently responsible for volume for the user's location. This is especially true of macros being recorded, when the situation of a multi-room audio/visual system is considered—it is not intended to change the volume in the room in which the macro was originally recorded, but the room in which the user currently finds him/herself.

The Switch is responsible for forwarding messages for a 'current' source or destination device to the actual device performing that function. It can also supply the reference for the mailbox for the current source or destination device. Messages to alter the content stream should be sent to the current source device (play, channel up, etc), those intended to affect the presentation of the content should be sent to the destination device (contrast, volume, etc).

Control of the Content Source

A uniform and consistent model for controlling the content stream is desirable. While terminology varies amongst source devices, the basic underlying structure is quite regular. Manipulation of a content source can be achieved in a general way by using a variable number of 'dimensions' (a variable length vector) to specify a 'position'. A simple tuner represents a single dimension, that of the channels it is able to select between from the broadband medium. A more complex example is a large CD changer, with more than one drive. The first dimension could be the drive, the second, a disc, third the track, fourth an index mark, fifth a time offset. This example is more interesting, since there are other specifications that might be useful, such as 'drive|disc|track|time offset', or just 'disc', which implies the device may select which drive, position at the beginning of the disc, which would be useful for specifying the disc for a play command.

The device may support multiple vectors, to allow different specifications. For each dimension, the device may indicate that the dimension can be specified absolute, relative, or 'motion', for specifying 'tape sport' type of control, like '×2 normal speed'. Also specified is the term to use for this dimension when representing it to the user.

Non-local Signal Routing

The Switch is concerned mostly with routing content within the local Class D device. Where a means of transferring content streams between devices exists, Switches may co-operate to route from a source connected to one Class D device to a destination connected to another. It may also be the case that a needed content conversion can only be done on another Class D device, and so non-local routing may occur even if both devices are attached to the same Class D device.

This process is initiated by the Switch on the Class D device containing the source device. The source device may or may not be the same as the one requesting the route be established. It determines the options it has for the portion of the route that it can establish locally, and sends the remainder of the route to the next Class D device along the route it selected. That device then does the same, until the destination device is reached. The final Class D device then determines the highest score, and returns that to the next-to-last Class D device, which multiplies it by its best score, and returns it to its predecessor, and so on, until the originating Class D device is reached. The originating Class D device now has one or more scores for the different routes that can reach the destination device. It selects the one with the highest score, and sends a confirmation to establish that route. To the others, it sends a cancellation, since there may have been resources reserved to enable the route to be established if it were confirmed.

Notification Manager

The Notification Manager is a service for asynchronous communication of a condition within the environment to the user.

'Applications' in system 100 are primarily concerned with interfacing the user with the underlying subsystems. As such, their primary concern is contributing a part of the system's overall user-interface.

Since Class C devices may also embed a user-interface for that device, along with the device abstraction, applications are written in such a way that knowledge of the overall system's user-interface is minimized, and the downloaded application can seamlessly integrate with the existing 'style' the a Class D device uses in presenting its interface. This is achieved by providing a library of high-level semantically-oriented user-interface elements, which provide standardized functionality with a platform-specific presentation. In this manner, manufacturers will be able to compete and differentiate their Class D products without the applications downloaded from Class C devices 'sticking out like a sore thumb'.

Providing the User-interface

Applications may be moved between Class D devices, in order to provide the user-interface for an Abstract Device located on a remote Class D device. This allows Class D devices to be 'headless', i.e. not provide a user-interface, and rely on other Class D devices that do provide one to interact with the user.

An application framework exists that orchestrates the individual applications within an environment provided by a Class D device. Since the environment is likely to be resource-constrained (e.g., only one application will be active at a time), the applications framework will instantiate them as needed, as the user navigates through the user-interface.

Since an Abstract Device cannot rely on its application to be instantiated and in possession of user-interface resources (such as a display device and input method) when the user needs to be informed of a problem, another mechanism needs to be provided to allow it to report a situation which requires the user to be notified, or to intervene. This is provided by the Notification Manager, a service of a Class D device. The Notification Manager is always active and available, and may display a message to the user at any time, independently of the currently active application.

Built on top of the Notification Manager is the Error Reporting Manager, an application service which can interpret an error message and report it to the user in a consistent manner. This service is useful in ensuring a consistently high standard of error reporting to the user without placing the entire burden on applications to provide it. Trouble-shooting a system is frequently a problem for non-technical users unused to methodical problem-solving, and concise, accurate and understandable error messages are essential for his audience (and still appreciated by the more technically-inclined).

We claim:

1. A consumer electronics system, comprising:

(a) a plurality of consumer electronics devices; and (b) a task-driven control means interconnecting the consumer electronics devices for controlling interaction among the consumer electronics devices, (c) the control means storing software representations of the interconnected consumer electronics devices and communicating with the consumer electronics devices via their respective stored software representations, and (d) at least one of the consumer electronics devices storing its own software representation within itself and downloading its own software representation to the control means for storage in the control means automatically without consumer interaction when first being interconnected to the control means.

2. The system of claim 1, wherein each of the respective software representations stored in the control means comprises a device abstraction for representing the respective device at a same semantic level common to all of the software representations.

3. The system of claim 2, wherein at least one of the respective software representations comprises an application of a user-interface to the device abstraction, the application being run on the control means.

4. The system of claim 1, wherein at least one of the consumer electronics devices is a home entertainment device.

5. The system of claim 1, wherein one of the consumer electronics devices is a home entertainment television receiver.

6. The system of claim 1, wherein one of the consumer electronics devices is a home entertainment VCR.

7. The system of claim 1, wherein one of the consumer electronics devices is a home entertainment CD-player.

8. The system of claim 1, wherein one of the consumer electronics devices is a home entertainment DVD-player.

9. The system of claim 1, wherein one of the consumer electronics devices is a telephone.

10. The system of claim 1, wherein one of the consumer electronics devices is a lighting control system.

11. The system of claim 1, wherein one of the consumer electronics devices is a thermostat.

12. The system of claim 1, wherein one of the consumer electronics devices is graphics navigation equipment in an automobile.

13. The system of claim 1, wherein one of the consumer electronics devices is an electronic climate control system in an automobile.

14. A method of enabling interaction among a multiplicity of consumer electronics devices, comprising the steps of:

storing a software representation of a consumer electronics device in the consumer electronics device itself;

interconnecting the consumer electronics device having the stored software representation of itself to a control means, the control means already storing a software representation in the control means that corresponds to each consumer electronics device already interconnected to the control means, each of the stored software representations in the control means interfacing between the control means and its corresponding consumer electronics device; and automatically downloading the software representation stored in the consumer electronics device to the control means for storage in the control means without consumer interaction when the consumer electronics device having the stored software representation of itself is first interconnected to the control means.

15. The method of claim 14 wherein the consumer electronics device storing a software representation of itself is a home entertainment devices.

16. The method of claim 15 wherein the home entertainment device is a home entertainment television receiver.

17. The method of claim 15 wherein the home entertainment device is a home entertainment VCR.

18. The method of claim 15 wherein the home entertainment device is a home entertainment CD-player.

19. The method of claim 14 wherein one of the consumer electronics devices is a telephone system.

20. The method of claim 14 wherein one of the consumer electronics devices is a thermostatic control system.

* * * * *